United States Patent
Morel

(10) Patent No.: US 6,697,428 B2
(45) Date of Patent: Feb. 24, 2004

(54) TRANSCODING METHOD AND DEVICE

(75) Inventor: Anthony Morel, Saint-Maur-Des-Fosses (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 622 days.

(21) Appl. No.: 09/761,232

(22) Filed: Jan. 16, 2001

(65) Prior Publication Data

US 2001/0021221 A1 Sep. 13, 2001

(30) Foreign Application Priority Data

Jan. 14, 2000 (EP) ............................................. 00400103

(51) Int. Cl.$^7$ .......................... H04N 7/12; H04N 11/04
(52) U.S. Cl. ........................... 375/240.03; 375/240.02; 375/240.12; 375/240.16; 375/240.04
(58) Field of Search ........................ 375/240.02, 240.03, 375/240.04, 240.12, 240.16

(56) References Cited

U.S. PATENT DOCUMENTS

| | | | | | |
|---|---|---|---|---|---|
| 5,333,013 | A | * | 7/1994 | Enari et al. | 375/240.03 |
| 5,537,440 | A | * | 7/1996 | Eyuboglu et al. | 375/245 |
| 5,940,130 | A | * | 8/1999 | Nilsson et al. | 375/240.12 |
| 6,208,688 | B1 | * | 3/2001 | Seo et al. | 375/240.03 |
| 6,259,739 | B1 | * | 7/2001 | Kondo | 375/240.23 |
| 6,446,037 | B1 | * | 9/2002 | Fielder et al. | 704/229 |
| 6,498,814 | B1 | * | 12/2002 | Morel | 375/240.12 |
| 6,570,922 | B1 | * | 5/2003 | Wang et al. | 375/240.12 |

FOREIGN PATENT DOCUMENTS

| EP | 0739138 A2 | 4/1996 |
|---|---|---|
| WO | 9800401 | 1/1998 |

* cited by examiner

*Primary Examiner*—Andy Rao
*Assistant Examiner*—Charles Parsons

(57) ABSTRACT

The invention relates to a transcoding method and device for converting input coded signals previously quantized with a first quantization scale Q1 into output coded signals quantized with a second quantization scale Q2. The transcoding device comprises a variable length decoder, a quantization step modifying stage, and a variable length encoder, said modifying stage itself comprising:

(i) means of selection of one out of two parallel requantizing devices;

(ii) a first requantizing device provided to be selected when the coding type corresponds to pictures used as references;

(iii) a second requantizing device provided to be selected when said coding type does not correspond to reference pictures.

5 Claims, 2 Drawing Sheets

TRANSCODING METHOD AND DEVICE

FIELD OF THE INVENTION

The present invention relates to a method of transcoding input coded signals previously quantized with a first quantization scale Q1 into output coded signals quantized with a second quantization scale Q2.

BACKGROUND OF THE INVENTION

Digital video compression techniques (such as MPEG-2), originally designed to broadcast digital video in the most cost-effective way, are now spreading in studios and in consumer products, since they allow to reduce transmission and storage costs. As a consequence, uncompressed video links are progressively replaced by compressed video links. This evolution is illustrated in FIG. 1:

- at the upper part of said figure, an uncompressed video bitstream UVB is processed by an encoder COD, whose output coded bitstream is received by a transmission channel or recording medium CM, having a bitrate constraint of X bits/sec, and later decoded by a decoder DECOD for reconstructing and displaying pictures corresponding to the original ones;
- at the lower part, the original bitstream UVB is coded in an encoder COD yielding a bitrate of Z bits/sec(Z>X), and the bitstream thus compressed is sent towards a transcoder TRANS whose output coded bitstream at Y bits/sec is also received by a transmission channel or recording medium CM and later decoded.

However, MPEG video systems are not optimized for successive encoding operations: for the same picture quality, direct encoding of uncompressed video requires a lower number of bits than transcoding of compressed video. Moreover, the straightforward transcoding solution, that consists of using a decoder and an encoder, is very expensive due to the encoder part.

A bitrate transcoder that is not based on cascaded decoder and encoder has been already proposed in the European patent application filed on Nov. 17, 1999, with the number 99402854.6 (PHF99608). Such a system, based on a re-quantization of the discrete cosine transform (DCT) data, is very simple, but only correct for intra-coded pictures. The re-quantization of inter pictures does not take into account the re-quantization carried out on the reference pictures. Since the predicted pictures may later be used themselves as reference pictures, errors may add up to the extent that a drift begins to be noticeable in the final decoded video sequence corresponding to the transcoded stream. Said drift impairs more and more the performance of the transcoder as the bitrate change due to the transcoder increases.

SUMMARY OF THE INVENTION

It is therefore the object of the invention to propose a new type of transcoder with reduced bitrate losses.

To this end the invention relates to a method of transcoding input coded signals previously quantized with a first quantization scale Q1 into output coded signals quantized with a second quantization scale Q2, comprising at least the steps of:

a) decoding the input coded signals, resulting in input decoded signals;
b) modifying the quantization step of said decoded signals;
c) encoding the modified decoded signals for obtaining the output coded signals;
wherein said modifying step comprises the following sub-steps:

(i) between said decoding and encoding operations, selecting one out of two parallel requantizing branches according to the picture coding type of said input decoded signals;

(ii) when said coding type corresponds to pictures used as references for future pictures to be transcoded, requantizing said input decoded signals by means of successive sub-operations including an inverse quantization with respect to the first quantization step Q1, a prediction, and a requantization with the second quantization step Q2;

(iii) when said coding type does not correspond to reference pictures, requantizing said input decoded signals by means of a filtering sub-operation the transfer function of which is $((Q1/Q2)+\epsilon)$ where $\epsilon$ is a correction factor.

BRIEF DESCRIPTION OF THE DRAWINGS

The present invention will now be described, by way of example, with reference to the accompanying drawings in which.

DETAILED DESCRIPTION OF THE INVENTION

Figure 1:
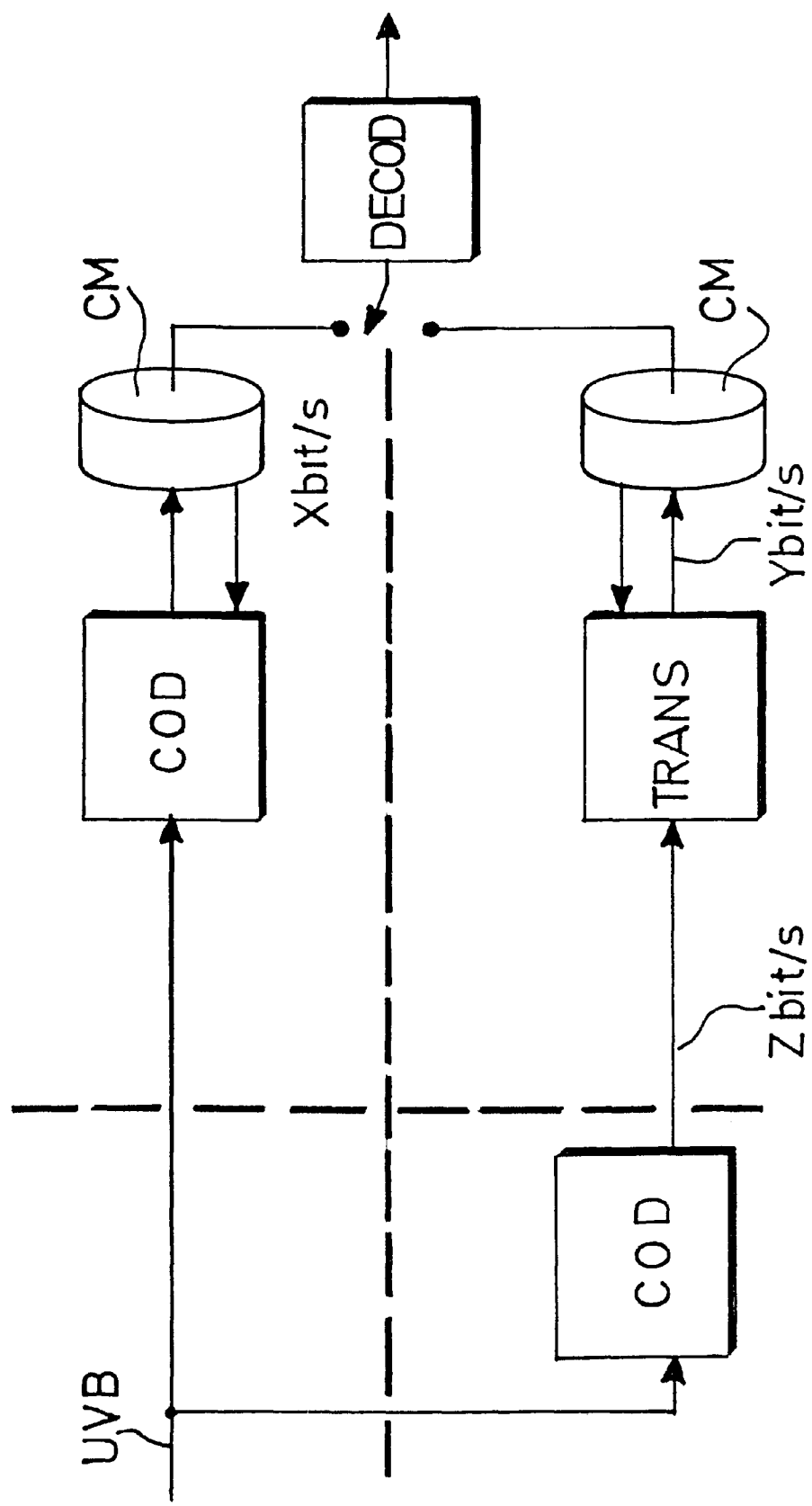
FIG. 1 illustrates the evolution of MPEG video systems towards transcoding.
Figure 2:
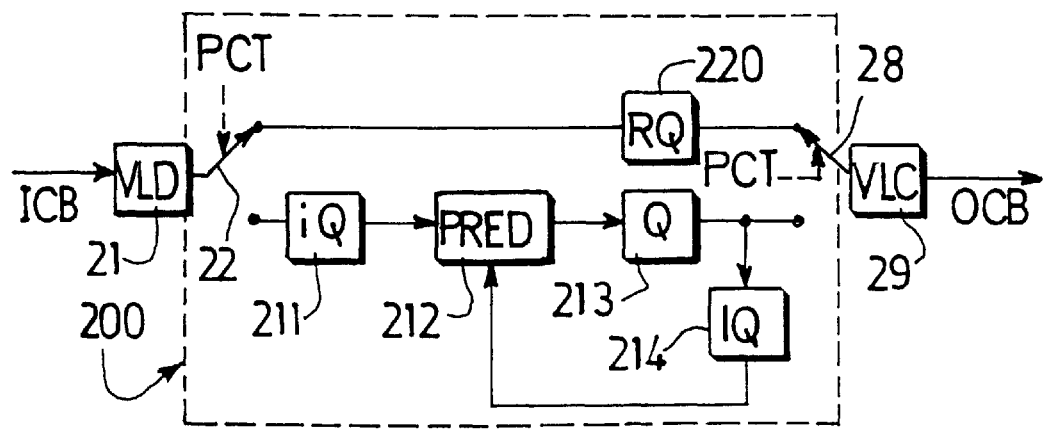
FIG. 2 shows an embodiment of the transcoder according to the invention.

An example of transcoder according to the invention is shown in FIG. 2. It comprises, between a variable length decoder 21 receiving the input coded bitstream ICB and a variable length coder 29 delivering the output coded bitstream OCB, a requantization stage 200 including two parallel branches.

Figure 3:
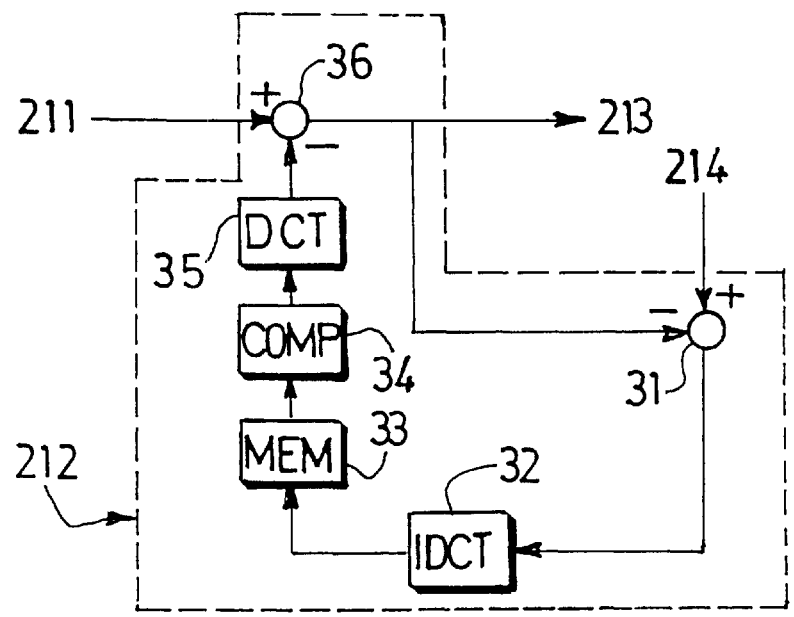
FIG. 3 depicts an example of prediction circuit as used in the transcoder of FIG. 2.

The first branch comprises in series the following elements: a first inverse quantizing circuit 211, a prediction stage 212 and a quantizing circuit 213, a second inverse quantizing circuit 214 being provided between the output of the circuit 213 and a second input of the stage 212. An embodiment of said stage 212, given in FIG. 3, comprises, as described for instance in the document EP 0690392 (PHF94001), a subtracter 36 between the output of the inverse quantizing circuit 211 and the input of the quantizing circuit 213, a subtracter 31 at the outputs of the subtracter 36 and the inverse quantizing circuit 214, and, in series between the output of the subtracter 31 and the negative input of the subtracter 36, an inverse discrete cosine transform (IDCT) circuit 32, a picture memory 33 (MEM), a motion compensation circuit 34 (COMP) and a DCT circuit 35.

The second branch comprises a requantizing circuit 220 that is, in the described implementation, a filtering circuit the transfer function of which is $((Q1/Q2)+\epsilon)$, where Q1 is the quantization step of the circuit 211, Q2 the quantization step of the circuit 213, and $\epsilon$ a correction factor. This requantizing circuit optimizes the mean square error between input and output values. Two switches 22 and 28 are provided at each end of said first and second branches, the first one at the output of the decoder 21 and the second one at the input of the coder 29. Said switches are controlled by the picture coding type PCT.

The requantization process carried out in the transcoder according to the invention is therefore hybrid. Pictures which are not used as a reference for future pictures to be transcoded (such as B pictures, in the MEPG-2 standard) are requantized by the second branch. Pictures which are used as a reference for future pictures (such as I and P pictures, according to the MPEG-2 standard) are requantized by the first branch.

As the input decoded signals of each branch are incoming quantized DCT coefficients IQC (i,j) (i=1 to 8, j=1 to 8, for pictures blocks of 8×8 picture elements), the signals at the output of the second branch are output quantized DCT coefficients OQC (i,j) given by:

$$OQC(i,j) = IQC(i,j) \times ((Q1/Q2) + \epsilon) \quad (1)$$

where $\epsilon=+1$ if IQC(i,j) is negative, or $\epsilon=0$ if IQC(i,j) is positive or equal to 0.

Alternatives to the described implementation may be proposed without departing from the scope of the invention. For instance, since the prediction stage 212 (PRED) does not have to handle bidirectionally predicted pictures (called B pictures), but only P pictures that need a single reference picture, the memory 33 can be reduced to a delaying circuit, the delay corresponding to a single picture, and, in the motion compensation circuit 34, only unidirectional motion compensation has to be implemented.

In the re-encoding part of a transcoder, a drift is generally introduced by the re-quantization step. The prediction stage 212 may also be implemented using a simultaneous motion compensation and field/frame conversion based on an error signal derived from said drift, and said simultaneous operations being adapted to the interlaced or non-interlaced transmission form of said error signal and of the prediction signal (said prediction signal is subtracted from the decoded signal in order to obtain the compensated signal to be requantized and re-encoded).

It will also be appreciated by one of ordinary skill in the art that the transcoding method can be implemented in hardware, software, or a combination of both, and then carried out by implementation of computer-executable process steps, thanks to a computer, a processor or a microprocessor associated to a computer-readable medium storing the appropriate set of instructions.

What is claimed is:

1. A method of transcoding input coded signals previously quantized with a first quantization scale Q1 into output coded signals quantized with a second quantization scale Q2, comprising at least the steps of:
    a) decoding the input coded signals, resulting in input decoded signals;
    b) modifying the quantization step of said decoded signals;
    c) encoding the modified decoded signals for obtaining the output coded signals;
    wherein said modifying step comprises the following sub-steps:
        (i) between said decoding and encoding operations, selecting one out of two parallel requantizing branches according to the picture coding type of said input decoded signals;
        (ii) when said coding type corresponds to pictures used as references for future pictures to be transcoded, requantizing said input decoded signals by means of successive sub-operations including an inverse quantization with respect to the first quantization step Q1, a prediction, and a requantization with the second quantization step Q2;
        (iii) when said coding type does not correspond to reference pictures, requantizing said input decoded signals by means of a filtering sub-operation the transfer function of which is $((Q1/Q2)+\epsilon)$ where $\epsilon$ is a correction factor.

2. For use in a transcoding device for converting input coded signals previously quantized with a first quantization scale Q1 into output coded signals quantized with a second quantization scale Q2, computer-executable process steps stored on a computer-readable storage medium and comprising at least the steps of:
    a) decoding the input coded signals, resulting in input decoded signals;
    b) modifying the quantization step of said decoded signals;
    c) encoding the modified decoded signals for obtaining the output coded signals;
    d) wherein said modifying step comprises the following sub-steps:
        (i) between said decoding and encoding operations, selecting one out of two parallel requantizing branches according to the picture coding type of said input decoded signals;
        (ii) when said coding type corresponds to pictures used as references for future pictures to be transcoded, requantizing said input decoded signals by means of successive sub-operations including an inverse quantization with respect to the first quantization step Q1, a prediction, and a requantization with the second quantization step Q2;
        (iii) when said coding type does not correspond to reference pictures, requantizing said input decoded signals by means of a filtering sub-operation the transfer function of which is $((Q1/Q2)+\epsilon)$ where $\epsilon$ is a correction factor.

3. A transcoding device for converting input coded signals previously quantized with a first quantization scale Q1 into output coded signals quantized with a second quantization scale Q2, comprising at least, in series:
    a variable length decoder for receiving the input coded signals and providing input decoded signals;
    a quantization step modifying stage;
    a variable length encoder for receiving the modified decoded signals and providing the output coded signals;
    wherein said modifying stage comprises:
        (i) means of selection of one out of two parallel requantizing devices according to the picture coding type of said input decoded signals;
        (ii) a first requantizing device for the requantization of said input decoded signals by means of successive sub-operations including an inverse quantization with respect to the first quantization step Q1, a prediction, and a requantization with the second quantization step Q2, provided to be selected when said coding type corresponds to pictures used as references for future pictures to be transcoded;
        (iii) a second requantizing device for the requantization of said input decoded signals by means of a filtering sub-operation, the transfer function of which is $((Q1/Q2)+\epsilon)$ where $\epsilon$ is a correction factor, provided to be selected when said coding type does not correspond to reference pictures.

4. A transcoding device as claimed in claim 3, wherein the quantization scales Q1 and Q2 are integer within a given range, and the transcoding device further comprises a memory circuit for storing the magnitude of Q1/Q2 for all the values of Q1 and Q2.

5. A storing medium comprising a software module for storing a set of instructions executable under the control of a computer or a processor and provided for performing at least some of the steps of the transcoding method as claimed in claim 1.

* * * * *